Patented June 15, 1943

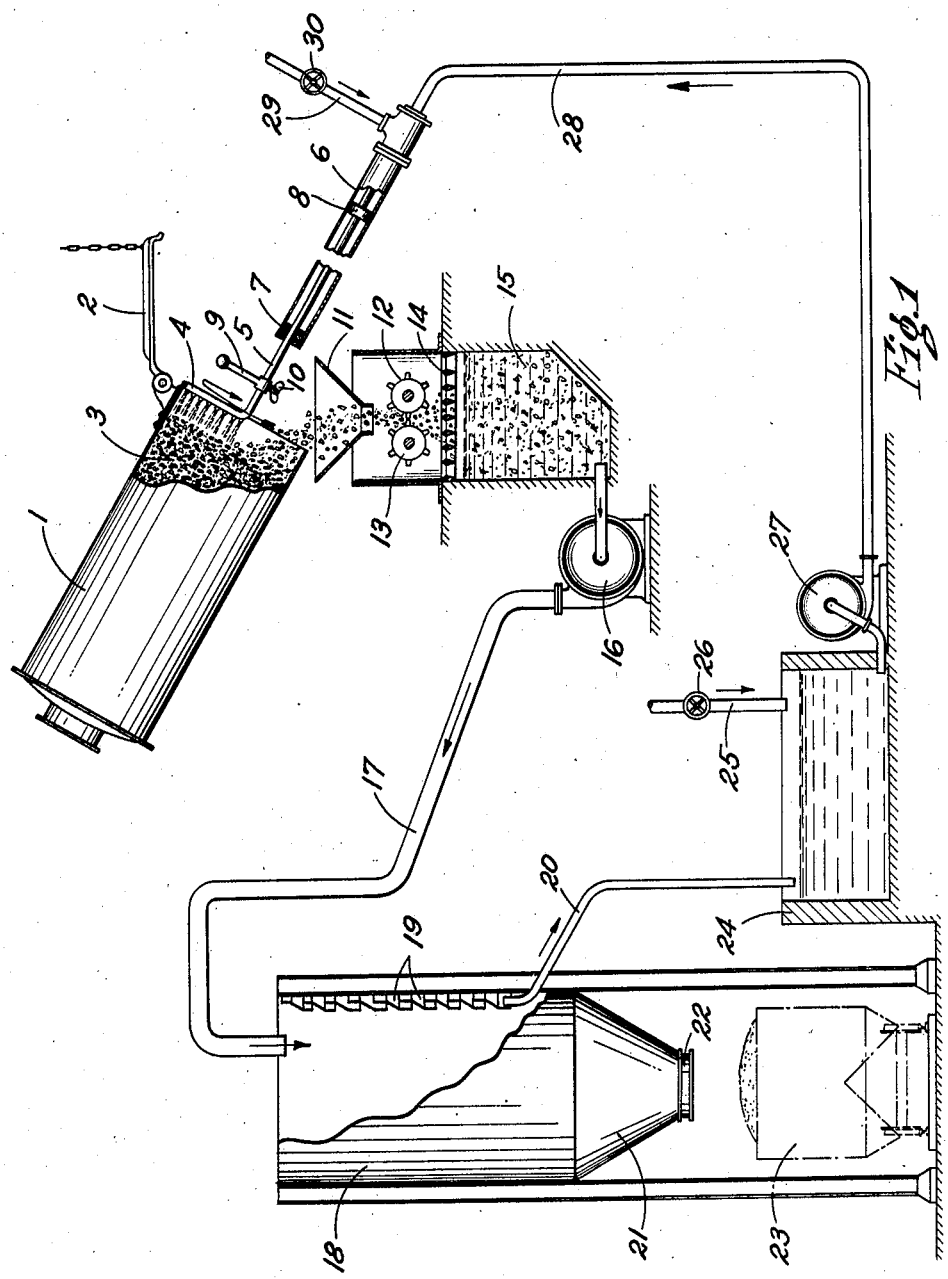

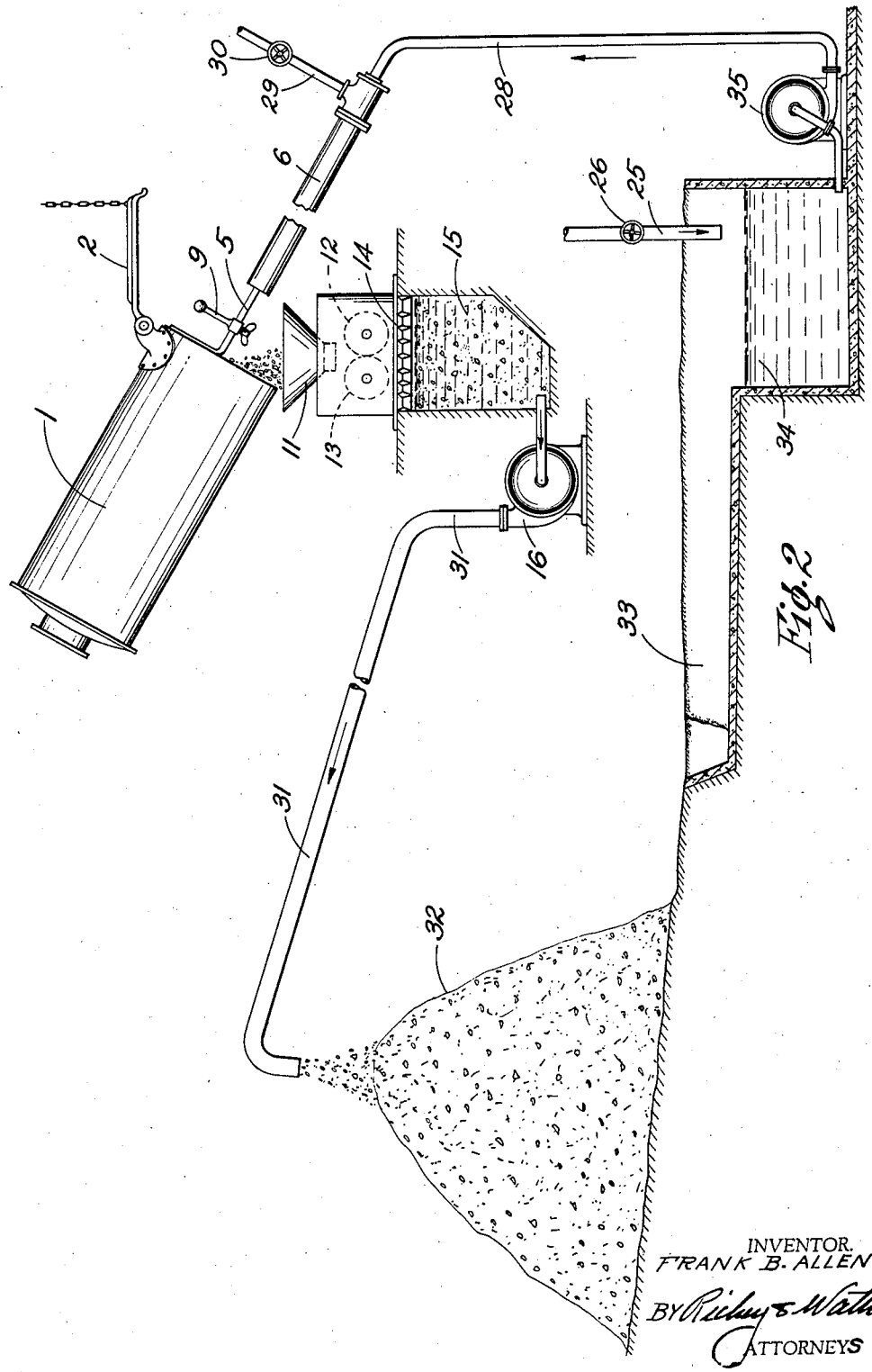

2,321,885

UNITED STATES PATENT OFFICE 2,321,885

MATERIAL HANDLING SYSTEM

Frank B. Allen, Lower Merion Township, Montgomery County, Pa., assignor to The Allen-Sherman-Hoff Company, Philadelphia, Pa., a corporation of Pennsylvania Application April 1, 1938, Serial No. 199,371

2 Claims. (Cl. 141—1)

This invention relates to material handling and more particularly to an improved method of removing solid or partially solid materials from vessels and disposing of the removed material.

In various industrial operations it at times becomes necessary to remove solid materials from closed vessels. My present invention contemplates the use of jets of high pressure fluid, such as water, for breaking up and removing solid material from the vessel and using the water from the jets as a conveying agent for carrying the broken and removed material to a point of disposal.

It is among the objects of my invention to provide an improved material handling system in which water, or other suitable fluid, may be used as an agent for breaking up and conveying solid material and the same water recirculated and used again so that a minimum quantity of water is required for continuous operation of the entire system.

The above and other objects of my invention will appear from the following description of certain embodiments thereof, reference being had to the accompanying drawings which diagrammatically illustrate arrangements of equipment embodying my improvements, and in which Figure 1 shows my apparatus adapted to discharge into a separating tank for solids and liquid, and Figure 2 illustrates my apparatus adapted to discharge the solids and liquid on to a pile from which the liquid is drained away.

The vessel 1, as illustrated, is an inclined cylindrical shell which is entirely closed except for the opening provided by a hinged end cover 2 at its lower end. When it is desired to remove the solid material, indicated at 3, the door 2 is opened as indicated in the drawing and jets of high pressure water are discharged against the solid material through a plurality of outlet nozzles on the portion 4 of the discharge pipe 5. The pipe 5 is preferably mounted so that it may be rotated to cause the jets of water to play against all parts of the face of the solid material in the vessel 1, the arrow indicating such rotation. It is also desirable to so mount the break up jets and the pipe 5 that they can be moved forwardly into the vessel 1 as the solid material is broken up and washed out. In order to accomplish this I have illustrated an elongated pipe or tube 6 in which the pipe 5 is slidably mounted, a suitable packing being provided at 7 and a guiding disc 8 being secured to the end of the pipe 5 to keep it centered in the tube 6.

As illustrated, the pipe 5 is adapted to be manually rotated and fed forward into the vessel 1 by a handle 9 which may be adjustably secured on the pipe 5 by a set screw 10. This sliding mounting of the handle 9 permits it to be moved along the pipe 5 as the pipe 5 is fed upwardly into the vessel 1. It will be understood by those skilled in the art that in some instances power actuated means for rotating and feeding the pipe 5 may advantageously be used.

The solid materials which are loosened and broken up from the face of the solid mass of material in the container 1 are washed out by the water from the break up jets into the hopper 11 from which they preferably pass through suitable sizing or crushing rolls 12 and 13 where they are reduced to such a size as to pass through the grid 14 into the sump 15. A centrifugal pump 16 withdraws the mixture of water and solids from the sump 15 and pumps it through a conduit 17 to the collecting and separating tank 18. This tank 18 is provided with a series of louvre openings 19 on one side which permit water to escape therefrom into the pipe 20 while retaining the solids in the tank 18. Such solids collect in the hopper shaped bottom 21 from whence they may be periodically discharged through a gate 22 into a railroad car 23 or other means for carrying away the solid materials. The pipe 20 conveys the water which has been separated from the solids into a reservoir 24. Additional water which may be required to make up a sufficient quantity to keep the system in operation may be supplied through the make up pipe 25 provided with a control valve 26. It will be understood that some water necessarily will be lost and carried away with the solid material which is discharged through the gate 22. The pump 27 withdraws water from the reservoir 24 and pumps it through the high pressure pipe or conduit 28 into the tube 6. Additional make up water may be supplied to the system through an auxiliary high pressure supply line 29 controlled by a valve 30.

In the operation of my improved material handling system water under pressure from the pump 27 is forced through the nozzles in the pipe 4 under high pressure and in a plurality of relatively fine streams which impinge against the face of the solid material in the vessel 1 and break it up and cause it to be washed down and discharged into the hopper 11. The same water which is utilized in breaking up the solid material is also utilized as a conveying agent which permits the solid material to be handled by the centrifugal pump 16 and forced into the separating tank 18. Additional water may or may not be supplied to the sump 15. My system, in which a supply of water is used to break up the solid material and convey it to a place of disposal and is then used over and over again in the same cycle, is extremely economical and efficient, being particularly advantageous in locations where there is a scarcity of water.

In Figure 2 I have illustrated a modified arrangement for my improved material handling system in which the same apparatus may be used for breaking up and removing the solid material as shown in Figure 1, but in which the discharge from the pump 16 is through a pipe 31 on to a sloping space of open ground where the solid material heaps up into a pile 32 and the water drains away from the pile down the sloping ground into a ditch or trench 33 which discharges into a reservoir 34. The high pressure pump 35 performs the same function as the pump 27 of Figure 1 and is adapted to force the water which is drained off from the solid material in the pipe 32 through the pipe 28 back into the discharge jets. It will be understood that the pile 32 might be located at a considerable distance away from the sump 15 and, where it is not desired immediately to carry away the solid material, the arrangement of Figure 2 provides a somewhat simpler means of disposing of the solids and separating them from the water than that illustrated in Figure 1.

It will be understood that the apparatus illustrated in the accompanying drawings is diagrammatically shown and that other variations and modifications may be made in the particular arrangement and form of the elements which make up my combination without departing from the spirit of my invention. I do not, therefore, wish to be limited to the particular form of my invention herein shown and described but claim as my invention all embodiments thereof coming within the scope of the appended claims.

I claim:

1. The method of removing material which is in the form of a solid mass in a vessel comprising the steps of discharging a plurality of streams of high pressure water, arranged in a line substantially perpendicular to the side of the vessel, against an exposed face of said mass to break the face portion thereof into pieces and dislodge them, rotating said streams about a point centrally of said face into contact with substantially all parts of the exposed face to break away the material from said face portion, more or less uniformly, and maintaining substantially constant the distance between the points of discharge of said streams and the exposed face as the material is dislodged.

2. The method of removing solid material which is in the form of a solid mass in a cylindrical vessel comprising the steps of discharging a plurality of streams of high pressure water from nozzles, arranged on a radius of said vessel, against an exposed end face of said mass to break the face portion thereof into pieces and dislodge them, rotating said nozzles about the longitudinal axis of the vessel, thereby bringing said streams into contact with substantially all parts of the exposed end face of the mass to break away the material from said portion more or less uniformly, and moving said nozzles longitudinally of the vessel as the material is dislodged from the exposed portion thereof and thereby maintaining substantially constant the distance between said nozzles and face.

FRANK B. ALLEN.